US009209916B2

(12) United States Patent
Platzer

(10) Patent No.: US 9,209,916 B2
(45) Date of Patent: Dec. 8, 2015

(54) METHOD AND APPARATUS FOR TRANSMITTING EVENT DATA

(75) Inventor: Peter Platzer, Linz (AT)

(73) Assignee: AMUsys Amusement Systems Electronics GmbH, Hoersching (AT)

( * ) Notice: Subject to any disclaimer, the term of this patent is extended or adjusted under 35 U.S.C. 154(b) by 377 days.

(21) Appl. No.: 13/326,160

(22) Filed: Dec. 14, 2011

(65) Prior Publication Data

US 2012/0113320 A1 May 10, 2012

Related U.S. Application Data

(63) Continuation of application No. PCT/EP2010/003597, filed on Jun. 16, 2010.

(30) Foreign Application Priority Data

Jun. 17, 2009 (DE) ......................... 10 2009 025 263

(51) Int. Cl.

| | |
|---|---|
| ***H04N 7/18*** | (2006.01) |
| ***G06F 3/00*** | (2006.01) |
| ***G06F 13/00*** | (2006.01) |
| ***H04N 5/445*** | (2011.01) |
| ***H04N 7/173*** | (2011.01) |
| ***H04H 20/18*** | (2008.01) |
| ***H04H 20/42*** | (2008.01) |

(52) U.S. Cl.
CPC ............... *H04H 20/18* (2013.01); *H04H 20/42* (2013.01)

(58) Field of Classification Search
USPC ........................ 725/60, 74, 94, 109, 112, 113
See application file for complete search history.

(56) References Cited

U.S. PATENT DOCUMENTS

| | | | | |
|---|---|---|---|---|
| 4,977,455 | A * | 12/1990 | Young | G04G 15/006 348/460 |
| 6,240,555 | B1 * | 5/2001 | Shoff | H04N 5/44543 348/E5.104 |
| 7,460,543 | B2 * | 12/2008 | Malik | H04L 12/5695 370/235 |
| 7,889,964 | B1 * | 2/2011 | Barton | G11B 27/034 386/240 |
| 2002/0052969 | A1 * | 5/2002 | Fujiwara | H04H 20/38 709/231 |
| 2002/0059626 | A1 * | 5/2002 | Lemmons | H04H 20/42 725/95 |
| 2003/0115612 | A1 * | 6/2003 | Mao | H04N 21/8586 725/136 |
| 2007/0089158 | A1 * | 4/2007 | Clark | 725/135 |
| 2008/0066111 | A1 * | 3/2008 | Ellis et al. | 725/57 |
| 2009/0064250 | A1 * | 3/2009 | Nakata | 725/109 |

* cited by examiner

*Primary Examiner* — Pinkal R Chokshi
*Assistant Examiner* — Alexander Gee
(74) *Attorney, Agent, or Firm* — Levine Bagade Han LLP

(57) ABSTRACT

The present invention relates to a method and an apparatus for transmitting event data to a display device, wherein both image sequences for displaying images of an event and supplemental data for the display of additional information relating to the event are transmitted as event data by a transmission device to the named display device. The event data are split and are transmitted over a plurality of transmission channels of differing bandwidth, with at least some of the image sequences being transmitted over at least one transmission channel of higher bandwidth and at least some of the supplemental data being transmitted over at least one transmission channel of lower bandwidth.

12 Claims, 2 Drawing Sheets

| | | | |
|---|---|---|---|
| Ü1/Event | A | D | C |
| Ü2/Event | E | A | F |
| D/Event | B,C,D,F | B,C,E,F | A,B,D,E |

METHOD AND APPARATUS FOR TRANSMITTING EVENT DATA

CROSS-REFERENCE TO RELATED APPLICATIONS

This application is a continuation of PCT Application No. PCT/EP2010/003597, filed 16 Jun. 2010, which claims priority to German Application No. 10 2009 025 263.0 filed 17 Jun. 2009, both of which are incorporated by reference herein in their entireties.

BACKGROUND

1. Field of the Invention

The present invention relates to a method and to an apparatus for transmitting event data to a display device and/or to a data processing device connectable thereto, wherein both image sequences for displaying images of an event, in particular in the form of a television image, and supplemental data for the optical and/or acoustic display of additional information relating to the event are transmitted as event data to the named display device and/or to the data processing device connectable thereto.

2. Description of the Related Art

On the live transmission of sports events and/or entertainment events over larger distances, satellite links or satellite transmission channels have been used in more recent times to be able also to transmit the images sequences and sound sequences of the respective event as directly as possible without time offset—that is substantially with only a time offset due to the time of transit of the signal—to far-away points of the earth. Transmission channels of high bandwidth are required for this purpose to be able to transmit image sequences and sound sequences of high quality to the screens at high resolution. Such transmission channels, which are usually only leased by the broadcasters, are as a rule very expensive so that the maximum possible bandwidth for the transmission should be utilized in the most efficient manner.

Special problems arise in this respect when, in addition to the live image sequences and sound sequences, additional information should be transmitted which require a preparation before the actual live transmission or a post-processing after the actual live transmission, but do not themselves require any high bandwidths. This is in particular the case on the transmission of game events which can be played with a stake and/or on betting events such as sports bets for which the odds should be determined and displayed before the respective event, while the odds recorded after the transmission of the event, which is the subject of the bets, should be transmitted. In a similar manner, the full utilization of the maximally available bandwidth of an expensive transmission channel is also difficult to achieve when the events to be transmitted overlap one another or, conversely, do not follow one another seamlessly so that there is a gap between the events.

Various transmission processes have already been proposed to combat the problems of inefficient bandwidth utilization. EP 1986359, for instance, describes a time-slice signaling for digital broadband broadcasting in which a data packet to be transmitted is first transmitted to an elastic buffer at a fast transmission rate from where the transmission then takes place at a lower speed, wherein information on the time interval to the following data packet is decoded from the buffered data packet.

WO 2008/020412 A2 describes a transmission process for image sequences of a television image to a receiver to which supplemental event data should also be transmitted. In this respect, the television image sequences and the supplemental event data are transmitted sequentially at different intervals, wherein the number of transmission intervals for the event data being reduced with respect to the image sequence transmission intervals to save energy in the standby mode of the receiver.

An event transmitter is furthermore known from WO 2007/090028 which carries out the transmission of event data with multiplexing and bandwidth control functions.

SUMMARY OF THE INVENTION

It is the underlying object of the present invention to provide an improved method and an improved apparatus of the initially named kind which avoids disadvantages of the prior art and further develops the latter in an advantageous manner. In particular an efficient and inexpensive transmission, in particular a live transmission, of event data should be achieved which utilizes the expensive transmission channels of high bandwidth in the best possible manner or manages with transmission channels having a bandwidth which is as low as possible to keep the transmission costs low.

This object is satisfied in accordance with the invention by a method in accordance with claim 1 as well as by an apparatus in accordance with claim 13. Preferred embodiments of the invention are the subject of the dependent claims.

A departure is therefore made from the approach of nesting different data packets with respect to an event as skillfully as possible into one another in order to be able to send all event data, including additional information, over the same transmission channel. It is rather the case that the totality of the event data to be transmitted are split into different data groups and are divided to a plurality of transmission channels of differing bandwidth in dependence on the bandwidth a respective data group requires in order then to reassemble the split data again locally at the target of the transmission path by means of a reception and/or data processing device so that they can be displayed together or at a predefined sequence relative to one another on a display unit. In accordance with the invention, provision is made in a technical method respect that the event data are divided and are transmitted over a plurality of transmission channels of differing bandwidth, with at least some of the image sequences being transmitted over at least one transmission channel of higher bandwidth and at least some of the supplemental data being transmitted over at least one transmission channel of lower bandwidth. Transmission channels having smaller bandwidths can be used—viewed overall—by the or dividing the event data to be transmitted to different transmission channels, with a bandwidth being sufficient for the transmission channel of a higher bandwidth which is required for transmitting the most exhaustive group of data which should not or cannot be further split up. As a rule, these are the image data and sound data of the live transmission of an event, that is, more precisely, the "naked" television sequences, while the supplemental data having the required additional information on a respective event are transmitted over a separate data channel of smaller bandwidth. In this respect, the bandwidth of the expensive television channel can substantially always be fully utilized, since supplemental data for an event and/or for a further event can be transmitted by the separate transmission channel of lower bandwidth parallel to the live transmission of this event so that the expensive television transmission channel does not have to be kept free for the preparation and postprocessing which is, for example, required for the preparation of the odds or of the announcement of the odds.

Generally different types of channels can be used for the different transmission channels. To enable a live transmission of the image sequences and sound sequences to almost any desired points of the earth, a satellite transmission channel is advantageously used for the transmission channel of higher bandwidth which connects the transmission device to the respective display device or to a local receiver and/or data processing device connectable thereto. A terrestrial transmission channel is advantageously used for the transmission channel of lower bandwidth which is used for the supplemental data, with this in particular being able to be a cable channel and/or an internet connection.

To be able to display the supplemental data having the additional information on an event in real time and/or parallel in time to the image sequences and sound sequences of an event, in particular parallel in time to a live transmission, provision is made in a further development of the invention that the image sequences belonging to an event and the supplemental data relating to the same event are transmitted parallel in time at least at times over the different transmission channels.

In order, on the other hand, also to be able to transmit supplemental information which requires a preparation before the event to be transmitted and/or a postprocessing after the transmission of the event has taken place, as is the case, for example, on the determination of odds and/or winning odds, provision can, however, also be made in a further development of the invention that the supplemental data on a specific event are transmitted at least partially offset in time to the transmission, in particular to the live transmission of the image sequences and sound sequences for the respective event. If, for example, an event A is just being transmitted live in television images over the transmission channel of high bandwidth to the local receiver and/or to the local data processing device, current odds can already be transmitted on a second even B which will take place subsequent to the event A, whereas conversely on the transmission of television images of the event B subsequent to the event A, determined winning odds can be transmitted over the separate transmission channel. The image sequences and sound sequences of different events requiring a high bandwidth can hereby be transmitted seamlessly after one another over the expensive transmission channel of high bandwidth, without said transmission channel having to be kept free or blocked for the transmission of the supplemental data only requiring a lower bandwidth.

In a further development of the invention, the separately transmitted image sequences and sound sequences, on the one hand, and the supplemental data, on the other hand, are reassembled again at the display device or at the local receiver device and/or the data processing device, which is connectable to one or more display devices, such that the separately transmitted image sequences and sound sequences as well as supplemental data which belong to one event can be displayed simultaneously together on a display device or in a predefined time sequence to one another on a display device.

To simplify the assembly at the local display device or at the data processing device connected thereto, the image sequences and sound sequences transmitted over the broadband channel are advantageously marked by marking data with reference to which the display device, a filter connected thereto and/or the data processing device connectable thereto can identify the respective image sequences and sound sequences and can combine them with the associated supplemental data. The named supplemental data can also advantageously be encoded with marking data to be able to identify the supplemental data at the end of the transmission path over the narrow-band channel and to combine them with the associated broadband data.

The named supplemental data can generally be of different kinds. They can in particular already include an image signal and/or a sound signal which is already suitable for controlling the display device. For example, image data and sound data of an odds chart can be transmitted as supplemental data, said chart being faded into the live image of the event being bet upon in the manner of a split screen.

Alternatively or additionally, the supplemental data can, in an advantageous further development of the invention, also be pure information signals which are per se not yet suitable to be displayed optically and/or acoustically on a display device, but which do have the advantage of a smaller data volume. An image signal and sound signal, which is then suitable for display on the display device, can advantageously be generated from the transmitted information data by a local data processing device at the end of the transmission path. The transmitted supplemental data can advantageously be prepared by a local processing device and can be transformed into image sequences and sound sequences which are then presented on the desired display device. A possible type of image generation is, in a further development of the invention, to fill prefabricated image masks with data so that then the image masks filled with data can be presented on the display as an image.

The transmission device can generally have different designs. The transmission device can in particular include, in an advantageous further development of the invention, a live transmission unit which transmits the image sequences and sound sequences of an event in the form of a live television image which is presented at the display device simultaneously or only offset in time by the transit time of the signal. Alternatively or additionally, the transmission device can also include a transmission memory which allows image sequences and sound sequences of an event to be sent with time delay. In order nevertheless to ensure an observation of the bet rules, for example on the transmission of a betting event on which bets may be placed, the supplemental data which can then include odds, for example, are inserted, as with a live transmission, parallel in time or previously and/or subsequently in the time displacement corresponding to a live transmission over the separate transmission channel such that the corresponding data are assembled correspondingly at the local receiver and/or intermediate distributor or the data processing device connected thereto and are provided to the respective display device in the corresponding time link with one another. The image sequences and sound sequences are therefore advantageously transmitted over the transmission channel of higher bandwidth and the supplementary supplemental data which arrive over the transmission channel of lower bandwidth are assembled by the same local data processing device or by mutually connected data processing modules to form a complete set of event data which are then displayed on a respective display device which receives the event data only after the assembly of the previously split up data groups by a common local receiver/transmitter device.

Alternatively or additionally, the local receiver and/or intermediate distributor can also have a buffer for buffering the image sequences received over the broad channel in order also to enable a seamless transmission on the transmission channel of higher bandwidth when a pause for displaying the separately transmitted additional information is required between two events.

The division of the event data to the different transmission channels of differing bandwidths can generally be controlled in different manners. The different data groups could, for example, be divided in accordance with a fixed ratio. Preferably, however, the event data are divided by the transmission device in dependence on the bandwidth required for their transmission, preferably such that a non-separable data group such as the image data of an event which require the largest bandwidth, is placed onto the transmission channel of the largest bandwidth, while the remainder of the event data to be transmitted or the portion for which the bandwidth of the smaller transmission channel is sufficient is transmitted by the latter. If in this respect the bandwidth of the smaller transmission channel is not sufficient, the supplemental data can be transmitted sequentially in blocks in transmission intervals. Alternatively or additionally, a plurality of transmission channels of smaller bandwidths can also be used.

In a further development of the invention, the transmission device can also be linked with a plurality of transmission channels of higher band widths to a local receiver device and/or intermediate distributor device and/or data processing device so that a plurality of events can be transmitted by the transmission device simultaneously and/or in at least a partly overlapping manner in the respective image sequence and/or sound sequence so that then different events can be offered for display by the local receiver device, distributor device and/or data processing device so that a plurality of display devices connected thereto can select which event they display.

If a plurality of events are intended to be transmitted over the transmission channels, in a further development of the invention, the time sequence of the events is controlled by a time control apparatus, in particular by displacement of the starting times of the events and/or of their transmission, such that the available bandwidth of the transmission channel of higher bandwidth or of the transmission channels of higher bandwidths is used ideally and, on the other hand, the total duration of the transmissions of the plurality of events remains as short as possible. The transmission of the image sequences of one or more events can in particular be displaced over the transmission channel or channels of higher bandwidth(s) if the bandwidth(s) of this transmission channel or of these transmission channels is/are already occupied or used up by another event and the transmission of its image sequences. If the available bandwidth of the transmission channels of higher bandwidths is not sufficient for the simultaneous or time-overlapping transmission of the image sequences of this plurality of events, at least one of the events is displaced so far in time that the sum of the bandwidths of the transmitted image sequences does not exceed the bandwidth of the available transmission channels. This can take place in a simple manner in that the transmission of a further event is delayed for so long until the transmission of the image sequences of an already ongoing event is ended. If, however, the bandwidth required for the transmission of the image sequences of an event varies over the extent of time of the event, the named time control apparatus can, however, also only displace the at least one event to be displaced so far that the peaks of the image sequences of the events to be transmitted critical with respect to the bandwidth are separated from one another in time. If, for example, a plurality of image sequences are transmitted, for example, from a plurality of camera positions for a first event, but in the further course fewer image sequences from only one camera position are transmitted so that initially a larger bandwidth is required for the transmission of this event than in the further course of the event, the transmission of a further event or of its image sequences can then be started via the named time control apparatus when the initial state in the transmission of the first event has ended. The named time control apparatus advantageously controls the time sequence of the transmissions of the image sequences of a plurality of events in dependence on the bandwidths of the image sequences of the events and/or on the extent of time of these bandwidths and, on the other hand, in dependence on the bandwidth of the available transmission channel(s) of greater bandwidth(s).

The displacement of the starting points in time of the events whose image sequences are to be transmitted is possible without problem on transmissions of stored events, but can also be carried out in live transmissions of events in that the start of the live event itself is carried out in dependence on the signal of the named time control apparatus. The named time control apparatus is in this respect advantageously formed such that no gaps, or gaps which are as small as possible, arise between the transmissions of different events or between the image data of these events over the transmission channels of large bandwidths in order to utilize these transmission channels of large bandwidths as best as possible.

In a further development of the invention, the time duration of the transmission and/or of the display of the supplemental data of an event can be varied, and indeed in particular in dependence on the aforesaid displacements of the starting point in time of the transmission of the image sequences of an event over the transmission channel of larger bandwidth and/or in dependence on the length of a gap between the transmission of the image sequences of two events. If, for example, a delay in the start of the beginning of an event results, for example on a live transmission, the supplemental data of this delayed event and/or the supplement data belonging to the preceding event are made available for longer, which can take place in that they are transmitted from the transmission device for a longer time or that they are provided for display for longer by the reception device, optionally with buffering. If, for example, a boxing match and dog race are transmitted as events, with the start of the dog race being delayed beyond the end of the boxing match, the winning odds of the boxing match and/or the odds of the delayed dog race can, for example, be transmitted and can be displayed for a longer time in the gap which arises here.

The invention will be explained in more detail in the following with respect to a preferred embodiment and to associated drawings. There are shown in the drawings:

DETAILED DESCRIPTION

Figures 1, 2:
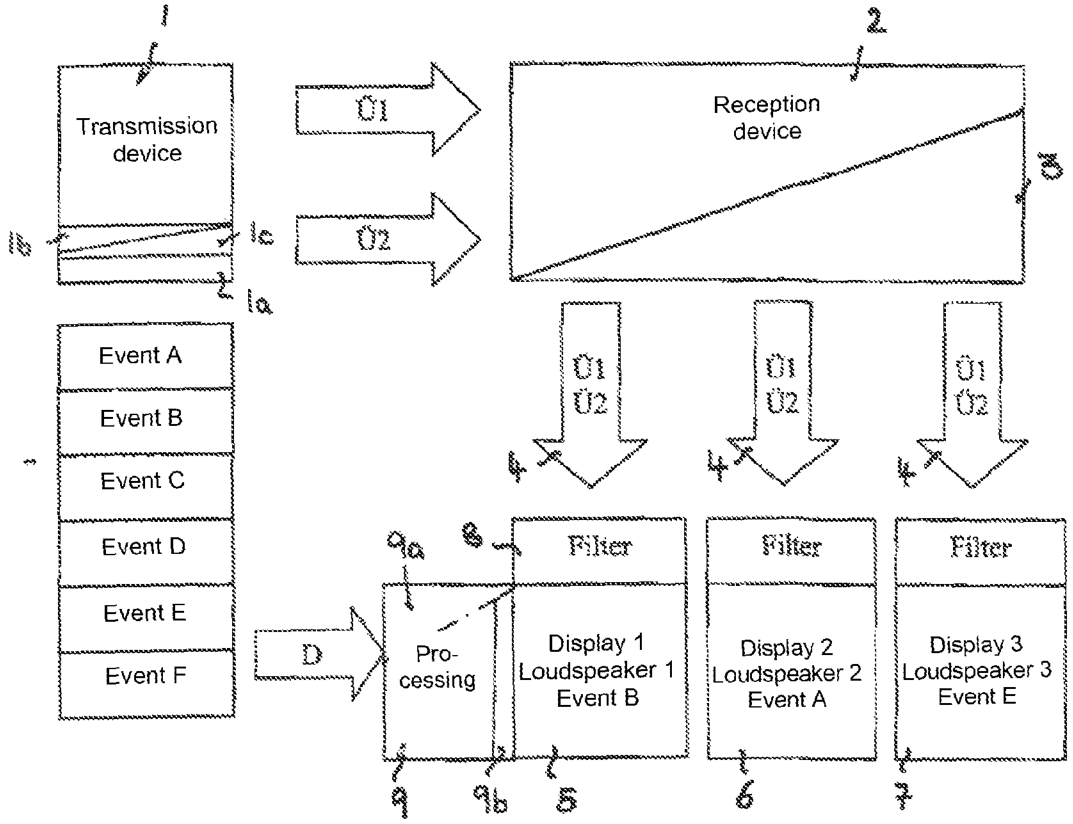
FIG. 1: a schematic representation of the apparatus for transmitting event data from a transmission advice to a plurality of local display devices in accordance with an advantageous embodiment of the invention in accordance with which two transmission channels of high bandwidths and one transmission channel of low bandwidth are provided.
FIG. 2: a schematic representation of the data assignment of the two transmission channels of higher bandwidths as well as of the transmission channel of lower bandwidth in their time sequence.

In the embodiment in accordance with FIG. 1, a central transmission device 1 is provided from where all the data required for the presentation of an event on local display devices are transmitted. The transmission device 1 can in this respect be a live transmission station which transmits corresponding image sequences and sound sequences live from a local event such as a boxing match or horse racing and includes—optionally separate in space—an information station from where additional information belonging to the boxing match or to the horse racing are transmitted which can likewise be generated locally, but can optionally also be generated at a spatially separate station position.

In the drawn embodiment, the transmission device 1 is, on the one hand, connected by means of two transmission channels Ü1 and Ü2 of higher bandwidths to a local reception device 2 so that image sequences and sound sequences of a plurality of events can be transmitted over the named transmission channels of higher bandwidths Ü1 and Ü2 from the transmission device 1 to the named reception device 2.

The named transmission channels Ü1 and Ü2 can be satellite transmission channels, for example.

The reception device 2 includes a data processing device 3, for example in the form of a data server and/or of a distributor, which forwards or distributes the received image sequences and sound sequences of the different events over a plurality of transmission channels 4, for example in the form of cables, to local display devices 5, 6, 7 which are preferably connected individually to the named data processing device 3 in the manner of a star network over the named local or regional transmission channels 4.

The named data processing device 3 can in this respect present each display device 5, 6, 7 with all received image sequences and sound sequences simultaneously for selection, i.e. the image sequences and sound sequences of a plurality of events A, B, C, D, E and F can be transmitted simultaneously and/or in their predefined order over the local transmission channels 4 so that it can be selected at the display device in each case which event should be displayed.

The reception device 2 therefore distributes all received image data to the locally available displays and loudspeakers. In this respect, the display devices 5, 6 and 7 can each have a filter module 8 to filter the image sequences, sound sequences and data sequences of a respective event of interest. The image sequences and sound sequences transmitted over the transmission channels Ü1 and Ü2 or the image sequences, sound sequences and data sequences forwarded to the reception device 2 by the data processing device 3 can for this purpose advantageously be encoded with marking data so that the filter module 8 can filter the desired event. The encoding by adding corresponding marking data can in this respect be effected by the transmission device 1, but can also be effected by the reception device 2 or by the data processing device 3 connected thereto.

On the other hand, the transmission device is connectable via a transmission channel D of lower bandwidth to the display devices 5, 6 and 7 or to a data processing device 9 connectable thereto to transmit supplemental data belonging to the events A to F for the display of additional information on the named display devices 5, 6 and 7.

The supplemental data transmitted over the narrower transmission channel D are advantageously prepared by the named data transmission device 9 and are transformed into image data and sound data or image and sound signals which can then be presented on the respective display devices 5, 6 and 7, with a possible type of image generation, for example, comprising filling prefabricated image masks with supplemental data transmitted over the transmission channel D or data derived therefrom.

The named data processing device 9, which is connected to the transmission device 1 over the narrower transmission channel D, but is linked to the display devices 5, 6 and 7, on the other hand, can generally be a part of the previously named data processing device 3 of the reception device 2 and/or a module coupled thereto. Alternatively, the named data processing device 9 can, however, also be a separate, local data processing module at the respective display device 5, 6 or 7 so that the named supplemental data are transmitted the whole distance up to the display device separately from the image sequences and sound sequences which are transmitted over the previously named transmission channels Ü1 and Ü2.

FIG. 2 in this respect shows a possible time link of the event data to the different events A-F. While, for example, the image sequences and sound sequences of an event A are first transmitted over the transmission channel Ü1, then the image sequences and sound sequences of an event D and finally the image sequences and sound sequences of an event C, the transmission channel Ü2 is used first to transmit the image sequences and sound sequences of an event E, then the image sequences and sound sequences of an event A and finally the image sequences and sound sequences of an event F, with the named transmission on the channel Ü2 respectively taking place parallel in time to the transmission on the channel Ü1, cf. FIG. 2.

The supplemental data of the named events A-F are transmitted on the narrower transmission channel D, with the supplemental data of the events respectively not to be transmitted on the transmission channels Ü1 and Ü2, that is of the events B, C, D and F, advantageously being transmitted on the narrower transmission channel D when the image sequences and sound sequences of the events A and E are transmitted on the transmission channels Ü1 and Ü2. If the events D and A are transmitted on the broadband channels Ü1 and Ü2 in the second interval shown, the supplemental data of the events B, C, E and F are accordingly transmitted on the narrower channel D, etc.

When, for example, first the transmission of the event A and then the transmission of the event D is selected at the display device 6, the additional information which is inserted via the data channel D can hereby be displayed on the named display device 6 in the break between these two events A and D.

The image sequences, sound sequences and data sequences transmitted on the transmission channels are advantageously encoded so that the filters can easily recognize the start and the end of a sequence on the respective transmission channel so that the link of the separately transmitted data can be effected correctly.

Figure 3:
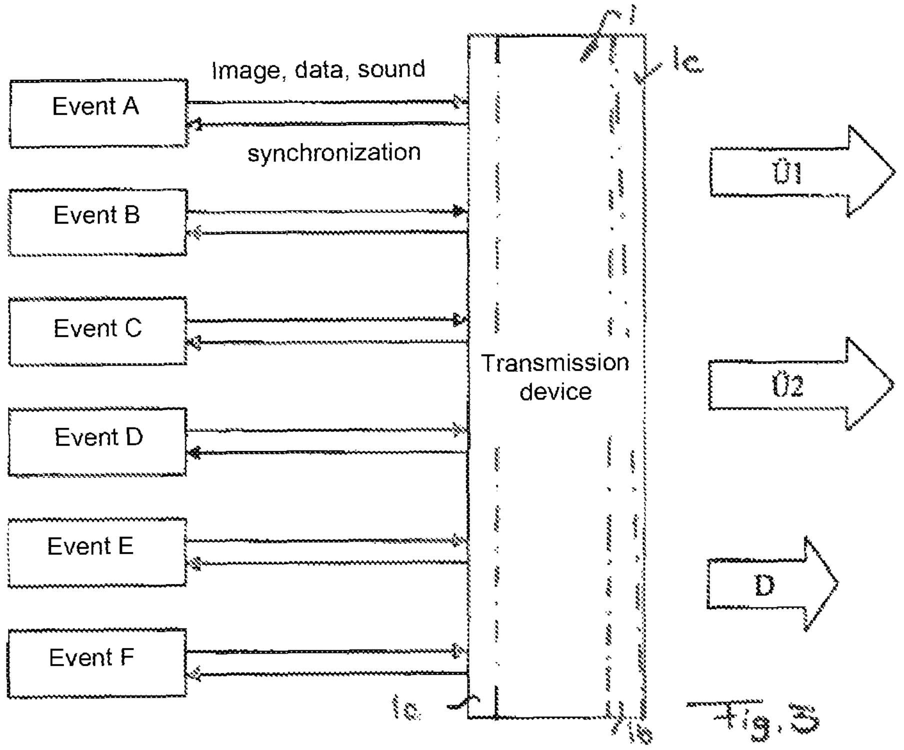
FIG. 3: a schematic representation of the transmission device of FIG. 1 which illustrates the feeding and the time-controlled transmission of a plurality of events.

FIG. 3 further illustrates the transmission device 1, with the named transmission device 1 being able to transmit image sequences on the events A-F in the already explained manner over two transmission channels Ü1 and Ü2 of greater bandwidths and supplemental data of these events over a further transmission channel D.

To utilize the bandwidth of the named transmission channels Ü1 and Ü2 of greater bandwidths ideally, the transmission device 1 includes a time control apparatus 1*a* by means of which the time sequence of the events A-F and/or the time sequence of their transmission is controlled. Since only two transmission channels Ü1 and Ü2 of high bandwidths are available in the embodiment of the transmission device 1 drawn, only two events with the associated image sequences and sound sequences can be transmitted per se. In order now ideally to utilize the named transmission channels Ü1 and Ü2, the named time control apparatus 1*a* displaces and/or controls the start time of the events such that the transmission of the image sequences of a third event is only started when one of the two currently transmitted events is ended. If therefore, for example, as is shown in FIG. 2, a car race as event A and a boxing match as event B are first carried out parallel in time and the image sequences and sound sequences thereof are transmitted parallel in time over the two transmission channels Ü1 and Ü2, further events, for example a cricket match as event C are delayed for so long until either the car race or the boxing match is ended and the associated image sequences are completely transmitted. The transmission of the image sequences and sound sequences of said cricket match is then started so that the named transmission channels Ü1 and Ü2 are utilized in the best possible manner.

Even if the start of an event is delayed for the transmission of the image sequences, the supplemental data of this event can by all means already be previously transmitted over the channel D of smaller bandwidth. The transmission and/or the display of these supplemental data, for example the current odds of the delayed cricket match, can then optionally be transmitted and/or displayed for a longer or shorter time depending on how long the delay of the cricket match lasts.

I claim:

1. A method for transmitting an event data stream including data sequences and supplemental data and displaying a data sequence and supplemental data on a display device, said method comprising:

transmitting said event data stream including a plurality of data sequences of a plurality of events via a first transmission channel;

transmitting said supplemental data comprising data sequences belonging to said events via a second transmission channel;

encoding the data sequences of the event data stream with marking data configured to identify a starting point and an ending point of each data sequence of said event data stream prior to transmitting it via said first transmission channel;

receiving said plurality of data sequences of the event data stream at a reception device;

filtering a specific data sequence of a specific event from the received event data stream on the basis of said encoded marking data;

identifying a starting point and an ending point of said filtered data sequence of the event data stream, assembling the filtered data sequence of said specific event, and displaying the filtered data sequence of said specific event together with the supplemental data of said specific event on a display device in a mutually coordinated manner, wherein displaying the supplemental data on the display device is postponed by a time control apparatus in response to postponement of the transmission of the starting point of the data sequence of the event data stream belonging to said specific event and in response to the length of a time gap between transmission of the data sequences of two events such that a time gap between the data sequences of said two events is substantially completely filled with the transmission of the supplemental data of at least one of said two events.

2. The method of claim 1, wherein a satellite transmission channel is used for at least one transmission channel of higher bandwidth and a terrestrial transmission channel is used for at least one transmission channel of lower bandwidth, wherein the terrestrial transmission channel comprises an interne connection.

3. The method of claim 1, wherein image sequences of the event and the additional information relating to the event are transmitted at least partly parallel in time and/or at least partly offset in time over the different transmission channels.

4. The method of claim 1, wherein both image sequences and sound sequences of a respective event are transmitted on a transmission channel of higher bandwidth.

5. The method of claim 1, wherein image sequences transmitted over a transmission channel of higher bandwidth are shown at the display device as a live display substantially simultaneously with the event to which the image sequences belong.

6. The method of claim 1, wherein the event data are divided by a transmission device dependent on the bandwidth required for their transmission.

7. The method of claim 1, wherein image sequences of a plurality of events A-F are transmitted from a transmission device parallel at time at least at times over a plurality of transmission channels of higher bandwidths to the display device and/or to a data processing device connectable thereto and supplemental data of a plurality of events A-F are transmitted over a transmission channel of lower bandwidth.

8. The method of claim 1, wherein the time sequence of the transmission of a plurality of events A-F is controlled by a time control apparatus dependent on bandwidths of image sequences of the events A-F and on bandwidth(s) of the available transmission channel(s) of higher bandwidths such that two or more events whose image sequences in sum exceed the bandwidth of the available transmission channel(s) of higher bandwidths are transmitted after one another by displacement of starting points in time of the event and/or of the transmission, with the starting points in time being displaced such that the transmission of the image sequences of a plurality of event takes place as seamlessly as possible over a transmission channel of higher bandwidth.

9. The method of claim 1, wherein with a plurality of available transmission channels of higher bandwidths, division of the transmission of a plurality of events A-F over the plurality of transmission channels is controlled by a distribution control device dependent on a length of the events A-F such that a sum of the lengths of the events transmitted over a transmission channel of higher bandwidth differs as little as possible from a sum of the lengths of the events transmitted over a further transmission channel of higher bandwidth.

10. The method of claim 1, wherein a duration of a transmission of the supplemental data of an event A-F over a transmission channel of lower bandwidth and/or a display of the supplemental data of an event A-F on the display device is controlled by a time control apparatus dependent on the displacement of a starting point in time of a transmission of image sequences belonging to the supplemental data over a transmission channel of larger bandwidth and/or dependent on a length of a gap between transmissions of image sequences of two events over the transmission channel of larger bandwidth, wherein a time gap between a transmission of image sequences of two events A-F is filled substantially completely by a transmission and display of supplemental data of at least one of the two events.

11. An apparatus for transmitting event data comprising a first output channel for outputting an event data stream including a plurality of data sequences of a plurality of events, and a second output channel for outputting supplemental data consisting of data sequences belonging to said events, a marking device, wherein the marking device encodes the data sequences of the event data stream with marking data configured to be filtered by a filter for identification of the starting point and the ending point of a data sequence of the event data stream, and a distributor for distributing the data sequences of the event data stream encoded with said marking data via said first output channel, and distributing the supplemental data via said second output channel, a time control apparatus, wherein the time control apparatus delays the starting points of the transmission of the data sequences of the data stream in response to the bandwidth of the data sequences and the bandwidth of the first output channel and for controlling the duration of the transmission of the supplemental data in response to a postponement of the starting point of the transmission of the data sequence of the event data stream belonging to such supplemental data and in response to a length of a time gap between the transmission of data sequences of the event data stream relating to two different events such that the time gap between the transmission of the data sequences of two events is filled substantially completely by the transmission of the supplemental data of at least one of said two events.

12. A reception device comprising a first input channel for receiving an event data stream including a plurality of data sequences of a plurality of events and a second input channel for receiving supplemental data including data sequences relating to such events;

a display device for displaying the data sequences of the event data stream and the supplemental data, a filter for filtering a data sequence of an event from the event data stream for displaying on the display device on the basis of marking data with which the data sequences are encoded, wherein said filter is configured to identify the beginning and the end of a data sequence of the event data stream, a data assembling device for receiving the supplemental data via said second input channel, said data assembling device being configured to display the supplemental data of a specific event and the data sequences of the event data stream of the same event as filtered by the filter on the display device in a mutually coordinated way, wherein a time control apparatus postpones displaying of the supplemental data belonging to a specific event on the display device in response to a postponement of the starting point of the transmission of the data sequence of the event data stream belonging to such supplemental data and in response to a length of a time gap between the transmission of data sequences of the event data stream relating to two different events such that the time gap between the transmission of the data sequences of two events is filled substantially completely by the transmission of the supplemental data of at least one of said two events.

* * * * *